United States Patent [19]
Smith

[11] Patent Number: 5,746,851
[45] Date of Patent: May 5, 1998

[54] TIRE REPAIR APPARATUS

[76] Inventor: James L. Smith, 1435 White City Dr., Canton, Ga. 30114

[21] Appl. No.: 613,900

[22] Filed: Mar. 11, 1996

[51] Int. Cl.$^6$ .............................. B29C 73/08; B29C 73/06
[52] U.S. Cl. ...................... 152/370; 81/15.7; 156/97
[58] Field of Search ................... 156/97, 95; 152/370, 152/367; 81/15.7, 15.5, 15.2

[56] References Cited

U.S. PATENT DOCUMENTS

| Re. 26,368 | 4/1968 | Brose . | |
|---|---|---|---|
| 557,851 | 4/1896 | Mercier . | |
| 566,562 | 8/1896 | Cox . | |
| 571,108 | 10/1896 | Colhapp . | |
| 581,641 | 4/1897 | Wolf . | |
| 743,963 | 11/1903 | Weigele | 81/15.7 |
| 1,456,403 | 5/1923 | Ranney . | |
| 1,565,440 | 12/1925 | Hainke | 81/15.7 |
| 1,633,330 | 6/1927 | Hughes | 81/15.7 |
| 2,727,554 | 12/1955 | Westfall | 152/370 |
| 2,866,494 | 12/1958 | Sanderson . | |
| 2,966,189 | 12/1960 | Chambers et al. . | |
| 2,991,819 | 7/1961 | Lee | 152/370 |
| 3,035,626 | 5/1962 | Mullen . | |
| 3,083,597 | 4/1963 | Best | 81/15.7 |
| 3,172,446 | 3/1965 | Gruber . | |
| 3,174,524 | 3/1965 | Nitzsche | 152/370 |
| 3,175,599 | 3/1965 | Clifford | 152/370 |
| 3,282,320 | 11/1966 | Klouza . | |
| 3,425,476 | 2/1969 | Legg | 152/370 |
| 3,542,614 | 11/1970 | Hopkins | 156/97 |
| 3,615,985 | 10/1971 | Reick et al. | 156/95 |
| 3,714,851 | 2/1973 | Orser | 81/15.7 |
| 4,243,089 | 1/1981 | Kenney | 152/370 |
| 4,548,102 | 10/1985 | DiRocco et al. | 152/370 |
| 4,579,161 | 4/1986 | Roberts | 152/370 |
| 4,716,792 | 1/1988 | Hector | 81/15.7 |
| 4,827,998 | 5/1989 | Stanfa | 152/368 |

FOREIGN PATENT DOCUMENTS

| 598820 | 5/1960 | Canada | 152/370 |
|---|---|---|---|

OTHER PUBLICATIONS

Tech International, Tech Tire Repairs Catalog, 1993, p. 16, catalog numbered items 250-1-254-1.

*Primary Examiner*—Geoffrey L. Knable
*Attorney, Agent, or Firm*—Jones & Askew, LLP

[57] ABSTRACT

A tire repair plug that is stretched in an insertion tool and inserted into a bored-out tire injury. The plug includes a cylindrical stem and a conical head disposed at the leading end of the cylindrical stem. A circular transverse opening is located slightly axially interior to the leading end of the cylindrical stem. A bearing surface is located at the bottom of the transverse opening to prevent the plug from sliding off the insertion tool. A transverse slit extends from the transverse opening to a trailing end of the stem and bisects the cylindrical stem into two halves with semi-circular cross-sections. The two halves have adjoining inner walls. Disposed along the outside of the cylindrical stem and along the inner walls is cushion gum sheet. A protective covering is disposed along the outside of the cushion gum sheet until the plug is ready for use.

8 Claims, 3 Drawing Sheets

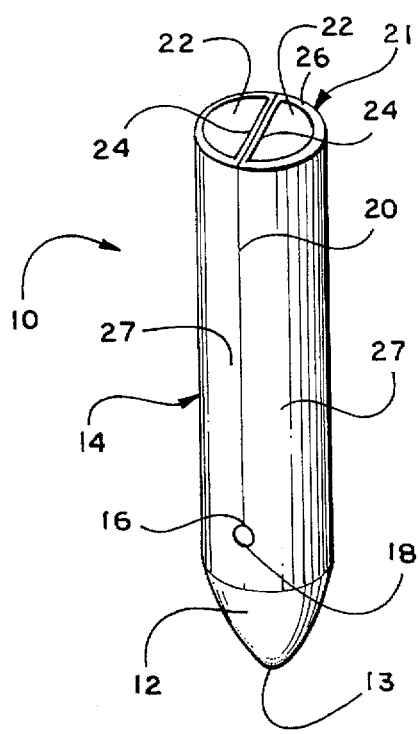
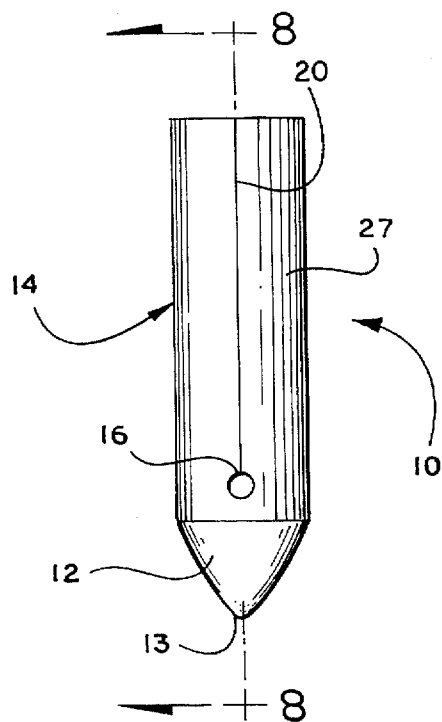
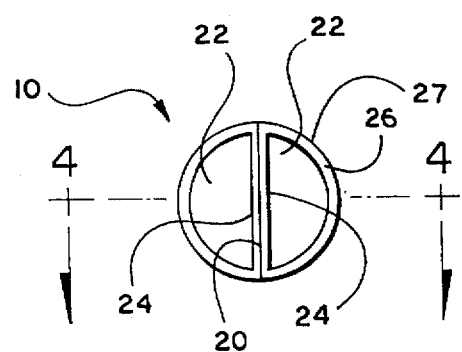

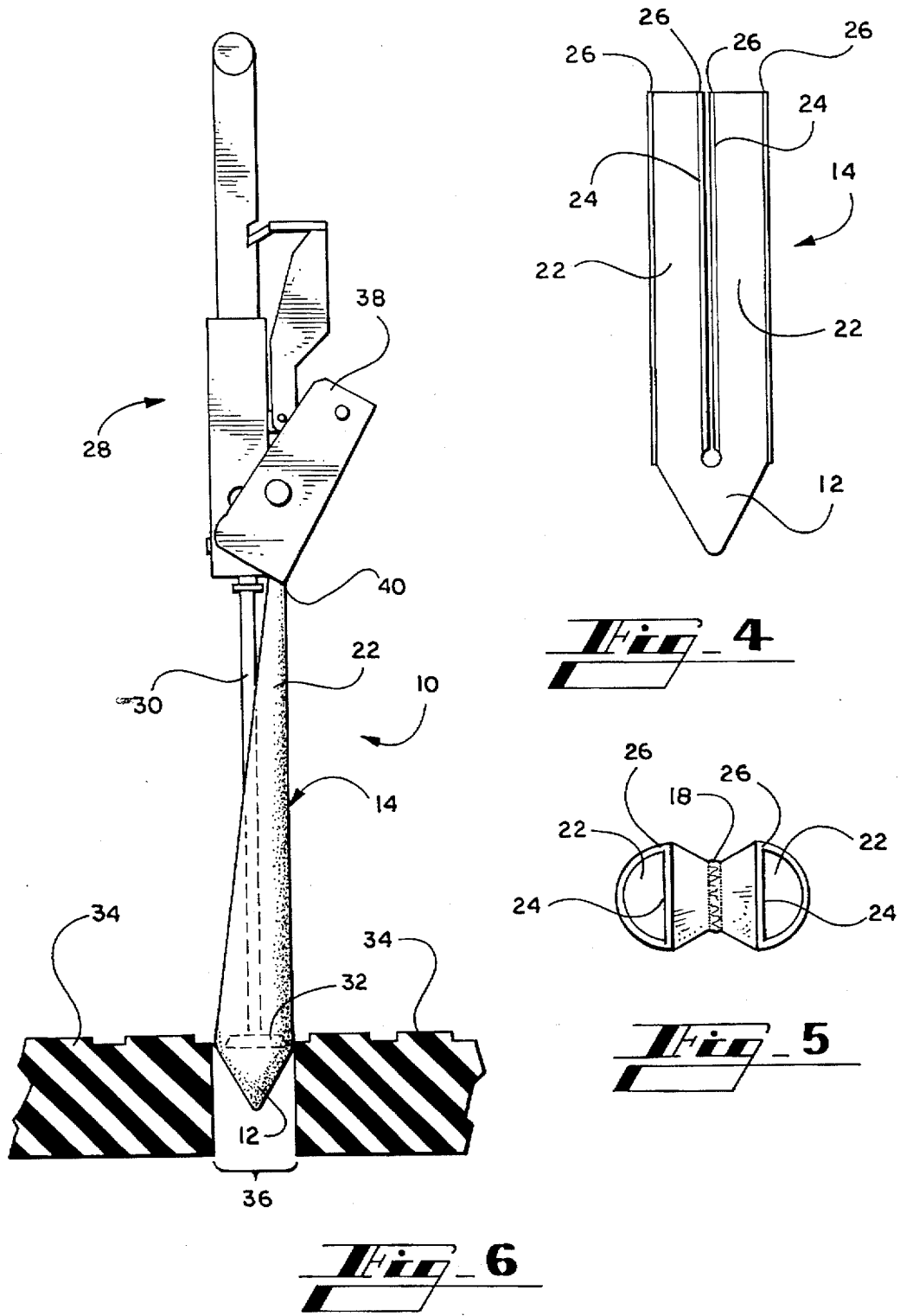

TIRE REPAIR APPARATUS

FIELD OF THE INVENTION

The present invention relates to tire repair and in particular is an apparatus particularly designed to repair an injury in a belted tire without removing the tire from the hub on which it is mounted.

BACKGROUND OF THE INVENTION

Tires are an essential, yet vulnerable, part of many vehicles. Tires are vulnerable to injury from nails, rocks, glass and numerous other sources. When a tire has been injured, a vehicle often times becomes immobilized and useless.

An injured tire can be costly to replace. However, even if the tire can be repaired, the repair is often expensive. For instance, repairing a large tire on a piece of construction equipment, such as an earthmover, requires that the tire be removed from the hub to repair the injury. The time required to remove the tire from the hub and repair the injury is valuable. The rental fee for large equipment, such as earthmovers, can be hundreds of dollars an hour. An injury to the tire of such a machine renders the machine useless until the injury is repaired or a replacement tire is found and installed.

Removing the tire from the hub and replacing it accounts for a large percentage of the time required to repair a large tire. If the tire did not have to be removed from the hub, equipment downtime could be saved. Thus, there is a need in the art for a tire repair plug that can be used to repair tire injuries from the outside without requiring the tire to be removed from the hub.

However, repairing an injured tire with a tire repair plug can be a futile endeavor if the tire repair plug does not provide a leak-proof seal. Thus, there is a need in the art for a tire plug that provides a tight, leak-proof seal for tires, including large tires such as those used on trucks and construction equipment.

Attempts have been made in the art to develop tire repair plugs that can be used to plug tire injuries without removing the tire from the hub. Clifford (U.S. Pat. No. 3,175,599), Kenney (U.S. Pat. No. 4,243,089), Wolf (U.S. Pat. No. 581,641) and Ranney (U.S. Pat. No. 1,456,403) are of interest as examples of some of these attempts.

Clifford describes a tire repair plug that includes an elongated body of substantially cylindrical cross-section. The body contains a longitudinal split extending from the lower end to a crotch formed by the split on the body. The split divides at least a portion of the body into two elongated "half-round" or cylindrical segments. A partially cured gum rubber layer covers the outer cylindrical surfaces of the segments and also extends between the inner surfaces. The plug is dipped in rubber cement before use so that the gum rubber shroud becomes soft and tacky, permitting the segments to move easily relative to one another and providing a bonding and vulcanizing medium.

A cylindrical tool is used to stretch the puncture hole and then the plug is placed into the puncture hole with the split end of the plug entering the puncture hole first. The tool is withdrawn from the tire, and the puncture hole engulfs and compresses the body of the plug. The pressure from the puncture hole causes the cylindrical segments to move relative to one another to conform to the true shape of the puncture hole. However, the plug shown by Clifford requires a tool to enlarge the puncture hole before insertion of the plug. Enlargement of the injury in steel-belted tires may be difficult. Furthermore, insertion of the plug described by Clifford would be difficult with a needle type insertion tool that stretches the plug.

Kenney describes a repair plug including an elongated body having a tapered head and a tail made of rubber of different moduli of extension. The diameter of the plug is greater than the diameter of the puncture hole so that the plug is retained in the puncture hole under compression and is bonded to the wall of the puncture hole by a suitable bonding agent. The plug head has a transversely extending hole. A prong on a repair tool engages with the hole to allow the plug to be pushed through the puncture hole in the tire. Because the head of the plug has a higher modulus of extension than the tail, the plug does not fold back on itself as it is inserted through the puncture hole. However, the plug shown by Kenney may be difficult to push into an injury in a tire because the plug has a larger diameter than the puncture hole and the plug is not stretched to a smaller diameter than the puncture hole. In addition, the plug may be damaged by the steel belts in some tires because the plug is forced through the puncture hole. Other possible disadvantages of Kenney are the difficulty of pulling the tool out between the plug and the injury after the plug is inserted and the possibility of damaging the surface of the plug as the tool is pulled out of the injury.

Wolf describes a rubber plug with a hole that extends from the top of the plug nearly to the tip of the plug. The tip is covered with a metal cover and the plug is stretched on a stretching tool and inserted into the tire injury. One of the disadvantages of the plug described by Wolf is that the force of the stretching tool is concentrated at a point which necessitates the use of a metal tip at the end of the plug to prevent the stretching tool from breaking through the end of the plug.

Ranney describes a plug with a longitudinal opening through the stem of the plug that extends nearly to the end of the plug. The plug is pushed into the tire injury using a tool. After inserting the plug, the longitudinal opening can be stuffed with cord soaked in cement to enlarge the stem and provide a better seal. However, a tight seal would not always be expected using the plug in Ranney because the central bore in the plug does not allow the tire to put an adequate compression force on the plug.

Thus, the prior art shows a need for a tire plug that provides a leak-proof seal. There is also a need for a plug that can be used to repair large tires for tractors, trucks and the like, so that these expensive tires can be repaired rather than replaced. Furthermore, there is the need for a plug that can repair steel or bias-ply tires. These is a further need for a plug for large tires that plugs from the outside and does not require the tire to be removed from the hub.

SUMMARY OF THE INVENTION

The present invention seeks to provide a tire repair plug that provides a leak proof seal for steel or bias ply tires that can be used to plug tires from the outside without requiring the tire to be removed from the hub.

In accordance with the invention, the objects are accomplished in an apparatus including a cylindrical stem. The cylindrical stem has a trailing end and a leading end. A conical head is situated adjacent to the leading end. Located inwardly from the conical head is a transverse slit. The transverse slit extends through the cylindrical stem and along the length of the cylindrical stem. According to one of its aspects, the present invention also has cushion gum sheet attached to the outside of the cylindrical stem and attached to the inner walls of the transverse slit. According to another of its aspects, the transverse slit of the present invention bisects the cylindrical stem such that the bisected portion of the cylindrical stem has two parallel inner walls. The cross section of the bisected portion of the cylindrical stem is two semi-circles.

According to another of its aspects, the present invention provides a transverse bore, or opening, through the cylindrical stem. The transverse bore communicates along its length with the bottom edge of the transverse slit. According to another of its aspects, the present invention has a transverse bore that defines a bearing surface opposite the traverse slit.

In a preferred embodiment, the tire repair apparatus of the present invention includes a cylindrical stem with leading and trailing ends and a conical head attached to the leading end. The cylindrical stem has a transverse opening. The cylindrical stem also has a transverse slit that extends from the transverse opening to the trailing end of the cylindrical stem. The transverse slit bisects the cylindrical stem so that the cross-section of the bisected portion of the cylindrical stem is two semi circles. The bisected portion of the cylindrical stem has two parallel inner walls. The parallel inner walls extend from the transverse opening to the trailing end of the cylindrical stem. Attached to the outside of the cylindrical stem and to the inner walls is cushion gum sheet.

According to another of its aspects, the present invention provides a system for repairing a tire injury. The system includes a cylindrical stem with a trailing end and leading end. Located at the leading end is a conical head. The cylindrical stem includes a transverse slit that extends through and along the length of the cylindrical stem to a location just inwardly from the conical head. The system also includes an insertion tool that comprises a shaft and a transverse bar attached to an extending end of the shaft. The transverse bar is adapted to be received in the transverse slit so that when the stem is aligned with the tire injury, pressure exerted on the bar through the shaft urges the conical head into the injury.

According to yet another of its aspects, the present invention provides a method for repairing a tire injury. The injury is prepared by enlarging the injury to a generally circular configuration. The outside walls and inside walls of a cylindrical stem of a tire plug are coated with vulcanizing cement. The tire plug includes a cylindrical stem with a leading and trailing end. The tire plug also includes a transverse opening in the cylindrical stem and a transverse slit in the cylindrical stem. The transverse slit extends from the transverse opening to the trailing end of the cylindrical stem. The transverse slit bisects the cylindrical stem so that the cross section of the bisected portion of the cylindrical stem is two semi circles. The bisected portion of the cylindrical stem has two parallel inner walls. The inner walls extends from the transverse opening to the trailing end of the cylindrical stem. The plug also includes cushion gum sheet attached to the outside of the cylindrical stem and attached to the inner walls. Attached to the leading end of the cylindrical stem is a conical head. The method for repairing the tire includes placing the tire plug on an insertion tool. The insertion tool includes a shaft and a transverse bar attached to an extending end of the shaft. The transverse bar is adapted to be received within the slit such that when the stem is aligned with the injury, pressure exerted on the bar through the shaft urges the conical head into the injury. The method for repairing a tire plug includes stretching the tire plug on the insertion tool until the diameter of the tire plug is less than the diameter of the injury. The tire plug is pushed into the injury with the insertion tool. The tire plug is released from the insertion tool so that the diameter of the tire plug increases to a size larger than the diameter of the injury. Finally, the insertion tool is removed back through the slit in the tire plug.

Other objects, features, and advantages of the present invention will be apparent upon reviewing the following detailed description of a preferred embodiment, when taken in conjunction with the drawings.

It is an object of the present invention to provide an apparatus that can be used to quickly and effectively repair a tire injury.

It is a further object of the present invention to provide such an apparatus that can be used to repair tire injuries in large tires without requiring removing the tires from the hub.

It is still a further object of the present invention to provide such an apparatus that can be stretched on a tool and inserted into the injury.

Other features and advantages of the present invention will be apparent to persons skilled in the art from the following detailed description of a preferred embodiment accompanied by the attached drawings wherein identical reference numerals will refer to like parts in the various views.

BRIEF DESCRIPTION OF DRAWINGS

FIG. 1 is a perspective view of the preferred embodiment of the present invention.

FIG. 2 is a side view of the preferred embodiment the present invention.

FIG. 3 is a top view of the preferred embodiment of the present invention.

FIG. 4 is a cross sectional view taken along line 4—4 of FIG. 3.

FIG. 5 is a top view of the preferred embodiment of the present invention with the two stem halves held apart.

FIG. 6 is a side view of the preferred embodiment of the present invention being stretched on an insertion tool and being inserted into a tire injury.

DETAILED DESCRIPTION OF THE PREFERRED EMBODIMENT

Figure 7:
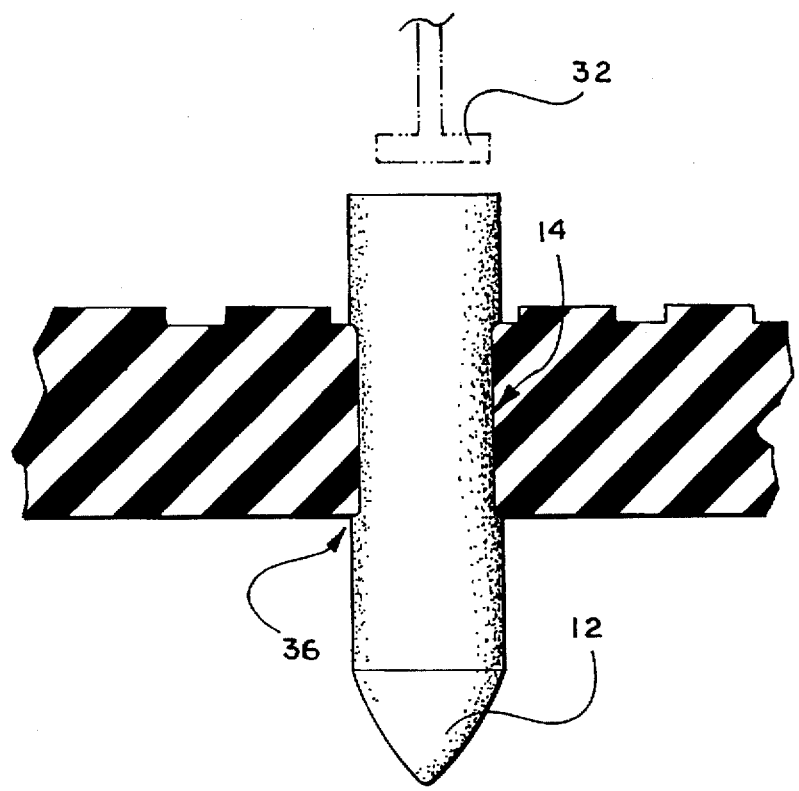
FIG. 7 is a side view of the preferred embodiment of the present invention after it has been inserted into a tire injury and the insertion tool is being released.

Referring now to the drawings, in which like numerals indicate like elements throughout the several views, FIG. 1 shows the preferred embodiment of a tire repair plug 10 constructed in accordance with the present invention. The tire repair plug 10 defines a conical head 12 disposed at a first, or leading end 13 of a cylindrical stem 14. Behind the head 12, a transverse opening 16, or bore, passes through the stem 14 and defines a bearing surface 18 directly above the head 12. A transverse slit 20 extends from the transverse opening 16 to a second, or trailing end 21 of the cylindrical stem 14 as best shown by the side view of the tire repair plug 10 in FIG. 2.

Referring back to FIG. 1, the transverse slit 20 divides the cylindrical stem 14 into two equal halves 22. By virtue of the transverse slit, each half 22 has an inner wall 24 that is adjacent and parallel to an inner wall 24 of the other half as best shown by the top view of the tire repair plug 10 in FIG. 3.

The cylindrical stem 14 and conical head 12 of tire repair plug 10 are generally composed of a rubber-type material or another suitable stretchable material. The cylindrical stem 14 and conical head 12 preferably are molded as one piece. Disposed on the outside of the cylindrical stem 14 and the inner walls 24 is cushion gum sheet 26 as can best be seen in FIG. 3. Cushion gum sheet 26 is a tacky substance that is well-known in the art for reacting with vulcanizing cement to vulcanize to a tire injury and provide a tight, leak-proof seal.

Referring to FIGS. 1-3, the outside of the cushion gum sheet 26 is covered by a removable protective covering 27. The protective covering 27 is a thin plastic sheet, preferably made of polyethylene. The protective covering 27 protects the cushion gum sheet 26 from damage until the tire repair plug 10 is ready for use. The protective covering 27 is disposed on the tacky cushion gum sheet 26 both around the outside of the plug and on the inner walls 24, and is peeled off when the tire repair plug 10 is ready for use.

Referring now to FIG. 4, a view taken along line 4—4 of FIG. 3 is shown. In FIG. 4, the protective covering 27 has been removed from the plug 10. In FIG. 4, the halves 22 and conical head 12 are shown. In addition, the cushion gum sheet 26 can clearly be seen in FIG. 4.

Referring back to FIG. 1, the conical head 12 is generally shaped like a cone with a rounded vertex. The conical head 12 is the first part of the tire repair plug 10 to enter a tire injury and the shape of the conical head 12 allows the tire repair plug 10 to easily enter the injury, as will be more fully described in reference to FIGS. 6-8.

Located at the base of the conical head 12 is the cylindrical stem 14. The cylindrical stem 14 is generally shaped as a right circular cylinder. The radius of the cylindrical stem 14 is the same as the radius of the base of the conical head 12. Before inserting the tire repair plug 10 into a tire injury, the tire repair plug is placed on an insertion tool and stretched until the radius of the cylindrical stem 14 is reduced, thereby facilitating the insertion of the tire repair plug into the injury. Insertion of the tire repair plug 10 will be more fully described in reference to FIGS. 6-8.

Referring to FIGS. 1 and 2, the transverse opening 16 is located on the cylindrical stem 14 slightly axially interior from the base of the conical head 12. The transverse opening 16 extends from one side of the cylindrical stem 14 to the other side of the cylindrical stem 14, and is generally circular in cross-section. The transverse opening 16 allows the two halves 22 of the cylindrical stem 14 to be spread apart without splitting apart the tire repair plug 10, so that an insertion tool can be inserted along the length of the tire repair plug. In addition, the two halves 22 of the tire repair plug need to be spread apart so that vulcanizing cement can be applied to the cushion gum sheet 26 along the inner walls 24 before inserting the tire repair plug 10 into an injury.

Referring now to FIGS. 1 and 5, a bearing surface 18 is formed at the bottom of the transverse opening 16 to provide an area against which an insertion tool (described below) can press without splitting the plug 10. In FIG. 5, a top view of the tire repair plug 10 is shown with the cover 27 removed and with the two halves 22 spread apart to show the bearing surface 18. The bearing surface 18 may optionally be textured with ridges, or grooves, to help prevent the insertion tool from slipping off the tire repair plug 10. The relationship of the bearing surface 18 and the insertion tool will be more fully described in reference to FIGS. 6-8.

Referring to FIGS. 2 and 3, the transverse slit 20 extends from the transverse opening 16 to the trailing end 21 of the cylindrical stem 14 opposite the conical head 12, and fully through the diameter of the cylindrical stem 14, thus bisecting the cylindrical stem 14 into the two equal halves 22.

Referring now to FIG. 4, a cross sectional view taken along line 4—4 of FIG. 3 is shown. Specifically, it can be seen in FIG. 4 that the cushion gum sheet 26 is disposed on the outside of cylindrical stem 14 and on the inner walls 24 of the tire repair plug 10.

Referring now to FIG. 6, the insertion of the tire repair plug 10 into an injury without removing the tire from its wheel will be described. An insertion tool 28 in accordance with U.S. Pat. No. 3,714,851 is shown. The needle type insertion shaft as disclosed in U.S. Pat. No. 3,714,851 has been modified to provide a shaft 30 to the end of which a transverse bar 32 is attached.

Also shown in FIG. 6 is a steel belted or bias ply tire 34. The steel belted or bias ply tire 34 includes an injury 36. As shown in FIG. 6, the tire injury 36 has been bored to a generally standard circular cross-section. Steel cutters, or reaming tools, which may be attached to power drills, are well-known in the art for boring out and cleaning injuries in tires. Next, a tire repair plug 10 is chosen to repair the injury 36. The tire repair plug 10 is chosen such that the diameter of the tire repair plug 10, unstretched, is slightly larger than the diameter of the injury 36. Thus, after the tire repair plug 10 is stretched and inserted, it will be released and swell back to its unstretched diameter and tightly plug the injury 36. The relationship between plug diameter and the size of the reamed out injury is well known in the tire repair art.

The protective covering 27 is removed from the inner walls 24 and outside of the cylindrical stem 14 of the tire repair plug 10. Before inserting the tire repair plug 10, the conical head 12, the cylindrical stem 14 and the inner walls 24 are coated with vulcanizing cement. The vulcanizing cement on the conical head 12 makes the conical head slippery so that the tire repair plug 10 is able to easily enter the injury 36. The vulcanizing cement on the cylindrical stem 14 and the inner walls 24 reacts with the cushion gum sheet 26 to form a bonding agent. The use of vulcanizing cement and cushion gum to provide a bonding agent is well-known in the art.

Figure 8:
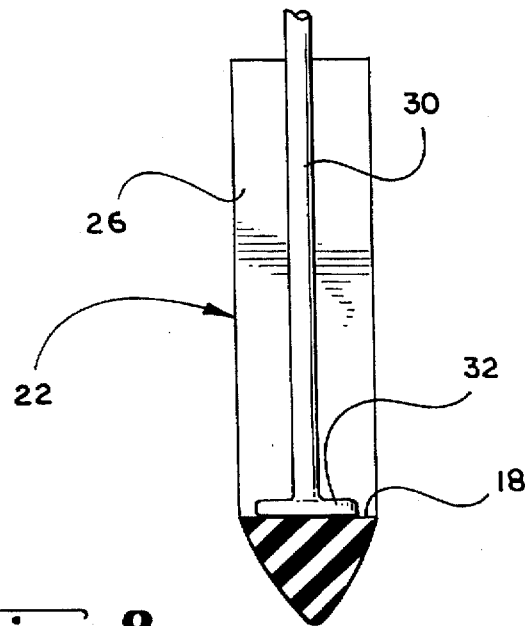
FIG. 8 is a side cross sectional view taken along line 8—8 of FIG. 2.

The tire repair plug 10 is placed on the insertion tool 28 after the vulcanizing cement is applied to the conical head 12, the cylindrical stem 14 and the inner walls 24. The transverse bar 32 of the insertion tool 28 is inserted along the transverse slit 20 until the transverse bar 32 comes into contact with the bearing surface 18 of the transverse opening 16. The width of the transverse bar 32 is less than the width of the bored out tire injury 36 so that the insertion tool 28 can easily be inserted into the injury and easily removed from the injury. The bottom of the transverse bar 32 may be provided with a textured surface, for example ridges, or grooves, similar to the bearing surface 18 so that the friction between the bottom of the transverse bar 32 and the bearing surface 18 prevents the transverse bar from laterally sliding out of the transverse opening 16. As shown in FIG. 8, the bottom of the transverse bar 32 sits flush against the bearing surface 18.

Referring back to FIG. 6, the two halves 22 are fixed into a clamp 38 of the insertion tool 28 at point 40. The tire repair plug 10 is then stretched into an elongate form with one of the stem halves 22 lying along each side of the shaft 30 of the insertion tool 28.

By stretching the tire repair plug 10, the diameter of the cylindrical stem 14 is reduced to a diameter smaller than the diameter of the bored-out injury 36. Thus, insertion of the tire repair plug 10 is facilitated by the stretching of the tire repair plug 10. Using the insertion tool 28, the tire repair plug 10 is then pushed into the injury 36 until the base of the conical head 12 has cleared the bottom of the injury 36.

Next, the clamp 38 is disengaged to release the two stem halves 22. Referring to FIG. 7, the cylindrical stem 14 attempts to swell to its normal, unstretched diameter which is larger than the diameter of the injury 36. As the swelling is resisted by the injury, the swelling force causes the plug 10 to seat within the injury completely filling the injury and pressing firmly against the tire around the injury. The insertion tool 28 is then pulled out of the injury 36 through the transverse slit 20. The vulcanizing cement and the cushion gum sheet 26 act as a bonding agent to bond the tire repair plug 10 to the injury 36. Pressure from the tire injury 36 forces the inner walls 24 of the tire repair plug 10 together until the vulcanizing cement and the cushion gum sheet 26 on the inner walls 24 bond the inner walls 24 and stem halves 22 together. After the tire repair plug 10 has been allowed to dry and bond to the injury 36, the part of the plug that extends outside of the tire 34 can be cut off at the surface of the tire.

It will now be appreciated that the preferred embodiment of the present invention includes a cylindrical stem with leading and trailing ends, a conical head attached to the leading end of the cylindrical stem and a transverse opening in the cylindrical stem. The cylindrical stem further includes a transverse slit that extends from the transverse opening to the trailing end of the cylindrical stem. The transverse slit bisects the cylindrical stem so that the cross-section of the bisected portion is two semi-circles. The bisected portion of the cylindrical stem has two parallel inner walls that extend from the transverse opening to the first end of the cylindrical stem. The preferred embodiment also includes cushion gum sheet attached to the outside of the cylindrical stem and attached to the inner walls and a protective covering disposed on the cushion gum sheet.

Based on the foregoing, it will be apparent that the preferred embodiment of the present invention provides a tire repair plug that provides a leak-proof seal for steel or bias-ply tires, even large tires such as those used on trucks and constructions equipment. Furthermore, it will be apparent that the preferred embodiment of the present invention does not require the injured tire to be removed from the hub before repairing the injury.

Given the foregoing disclosure of the preferred embodiment and design parameters for the present invention, other embodiments of the present invention will suggest themselves to those skilled in the art. Therefore, the scope of the present invention is to be limited only by the claims below.

What is claimed is:

1. A tire repair plug for insertion into an injury in a tire and plugging of said injury, comprising:
    a cylindrical stem with a trailing end and a conical head at a leading end;
    a transverse slit in said cylindrical stem, said transverse slit extending through and along the length of said cylindrical stem to a location spaced inwardly from said conical head; and
    a transverse bore through said stem communicating along its length with a bottom edge of said transverse slit.

2. The apparatus of claim 1, wherein said transverse bore defines a bearing surface opposite said slit.

3. The tire repair plug of claim 1, further comprising cushion gum sheet attached to the outside of said cylindrical stem and attached to the inner walls of said transverse slit.

4. The tire repair plug of claim 1 wherein said transverse slit bisects said stem such that the cross-section of said bisected portion of said cylindrical stem is two semi-circles and such that said bisected portion of the cylindrical stem has two parallel inner walls.

5. A tire repair plug for repairing an injury in a tire, comprising:
    a cylindrical stem with a leading end and a trailing end;
    a transverse bore in said cylindrical stem;
    a transverse slit in said cylindrical stem, said transverse slit extending from said transverse bore to said trailing end of said cylindrical stem, said transverse slit bisecting said cylindrical stem such that the cross-section of said bisected portion of the cylindrical stem is two semi-circles and such that said bisected portion of the cylindrical stem has two parallel inner walls, said walls extending from said transverse bore to said trailing end of said cylindrical stem;
    cushion gum sheet attached to the outside of said cylindrical stem and attached to the inner walls; and
    a conical head attached to said leading end of said cylindrical stem.

6. The apparatus of claim 5 wherein said apparatus is molded as one piece.

7. A system for repairing an injury in a tire, comprising:
    a tire repair plug comprising a cylindrical stem with a trailing end and a conical head at a leading end;
    a transverse slit in said cylindrical stem, said transverse slit extending through and along the length of said cylindrical stem to a location spaced inwardly from said conical head; and
    an insertion tool for inserting said tire repair plug into said tire, comprising a shaft and a transverse bar attached to an extending end of said shaft;
    said bar being adapted to be received within said slit such that when said stem is aligned with said injury, pressure exerted on said bar through said shaft urges said conical head into said injury.

8. A method for repairing a injury in a tire comprising the steps of:
    preparing said injury by enlarging said injury to a generally circular configuration;
    coating with vulcanizing cement outside walls and inside walls of a cylindrical stem of a tire plug, said tire plug comprising:
        a cylindrical stem with a leading end and a trailing end;
        a transverse opening in said cylindrical stem;
        a transverse slit in said cylindrical stem, said transverse slit extending from said transverse opening to said trailing end of said cylindrical stem, said transverse slit bisecting said cylindrical stem such that the cross-section of said bisected portion of the cylindrical stem is two semi-circles and such that said bisected portion of the cylindrical stem has two parallel inner walls, said walls extending from said transverse opening to said trailing end of said cylindrical stem;
        cushion gum sheet attached to the outside of said cylindrical stem and attached to the inner walls;
        a conical head attached to said leading end of said cylindrical stem
    placing said tire plug on an insertion tool, said insertion tool comprising a shaft and a transverse bar attached to an extending end of said shaft;
    said bar being adapted to be received within said slit such that when said stem is aligned with said injury, pressure exerted on said bar through said shaft urges said conical head into said injury, stretching said tire plug on said insertion tool until a diameter of said tire plug is less than a diameter of said injury;

pushing said tire plug into said injury with said insertion tool;

releasing said tire plug from said insertion tool such that said diameter of said tire plug increases to a size larger than said diameter of said injury; and removing said insertion tool back through said slit in said tire plug.

* * * * *